D. A. KELLOGG.
Improvement in Harvester-Rakes.
No. 114,827. Patented May 16, 1871.
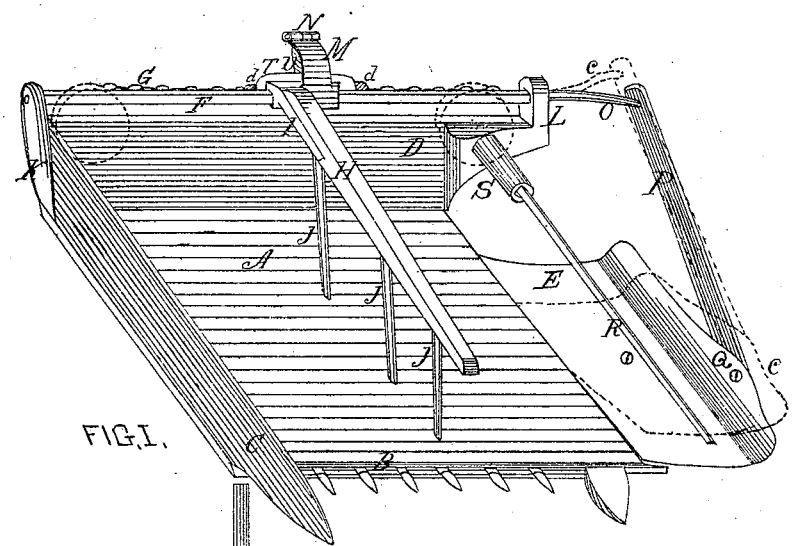
FIG. I.
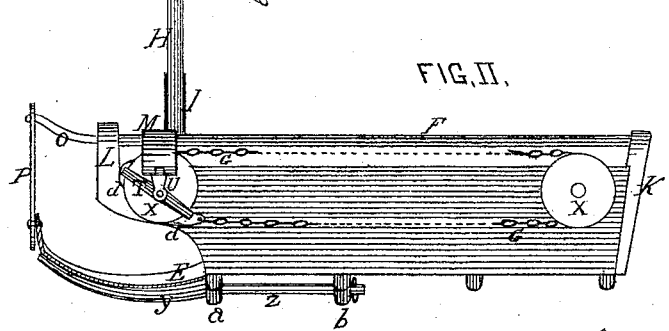
FIG. II.
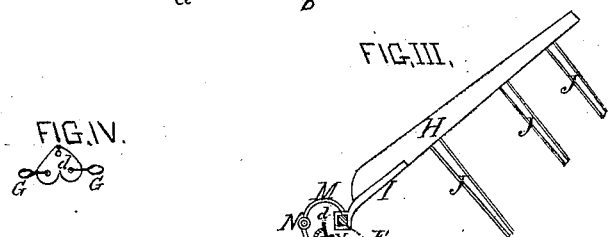
FIG. III.
FIG. IV.
Witnesses
Charles C. Kennedy
[signature]
Inventor
Dennis A. Kellogg
By G. L. Chapin
Attorney

UNITED STATES PATENT OFFICE.

DENNIS A. KELLOGG, OF VALPARAISO, INDIANA.

IMPROVEMENT IN HARVESTER-RAKES.

Specification forming part of Letters Patent No. 114,827, dated May 16, 1871.

I, DENNIS A. KELLOGG, of Valparaiso, in the county of Porter and State of Indiana, have invented certain new and useful Improvements in Grain-Rakes and Gavel-Platforms, of which the following is a specification:

*Nature and Object of the Invention.*

The nature of the present invention consists, first, in carrying the rake back and forth over the platform by means of an endless chain, and raising and lowering the rake by means of a yoke attached to said chain and operated by the pulleys over which the chain passes; second, in a gavel-platform, which is pivoted to the grain-platform and operated automatically by the bar on which the rake slides, so as to dump or discharge the gavel after it has been raked, as the whole is hereinafter fully described and shown.

Figure 1 is a perspective representation of my improved rake and gavel-platform; Fig. 2, a back view of the same; Fig. 3, a section.

A represents the grain-platform, B the cutter-bar, D the back, and C the grain-divider, of an ordinary harvester, said parts being detached from the running-gear. No novelty is claimed in their regard.

The back D is provided with projecting standards K L, which support a crank-shaft, F O. On this shaft is arranged to slide a rake, H I J, the part I being made of metal and having a mortise, through which the crank-shaft F O passes. The said part I terminates in a curved arm, M, to which, by means of a connecting-plate, U, a yoke, T, is hung, as shown in Figs. 2 and 3, the plate U being hinged to the arm M and pivoted to the yoke, so that the latter may swing around the pulleys X, and so that the rake may rise up, as shown at Figs. 2 and 3.

The means for connecting the yoke T with the chain G consists of two plates, $d$, which are pivoted to the bent ends of the yoke, as shown at Fig. 3, said plates being provided with holes to receive the links of chain, which is continuous. This arrangement is such that when the yoke is passing around the pulleys X its central part does not travel so far as the chain; consequently the rake is quickly raised and lowered, the rake being carried flat on platform A when the yoke is moving on the upper chain line, and carried back in a raised position when the yoke is moving on the lower chain line. Consequently the rake is brought automatically into position to carry a gavel onto platform E and move back above the falling grain.

The power for driving the chain consists of a shaft, R, which receives motion from the gearing of the harvester, and which rotates a coupling, S, fixed to one of the wheels X, placed nearest the platform E. This platform is rigidly fastened to a bar or spindle, Y, which is provided with a suitable shank, Z, arranged to turn in bearings $a\,b$, placed under and fastened to grain-platform A, as shown in Figs. 2 and 3.

To the outer side of the platform E is pivoted a connecting-rod, P, the opposite end of which is fixed to a wrist on the crank O, formed on the shaft F. This arrangement is such that when the rake rises up the square shaft F is partly turned over, and consequently carries the crank back, as shown in dotted lines $c\,c$, and tips the platform E back and discharges a gavel. This movement is very quick, and accomplished by the peculiar construction and arrangement of the yoke above described.

*Claims.*

1. The yoke T, combined with the chain G, pulleys X, and curved arm M, as and for the purpose described.

2. The square shaft F O, combined with the curved arm M, connecting-rod P, and platform E, for discharging a gavel, as specified and shown.

3. The combination of the platform A E, rake H I J, chain C, yoke T, and pulleys, substantially as set forth.

DENNIS A. KELLOGG.

Witnesses:
ALFRED W. KELLOGG,
A. E. SMITH.